Aug. 5, 1958     H. F. GINGRICH     2,846,633
PROTECTION DEVICE FOR MOTOR DRIVEN EQUIPMENT
Filed Jan. 14, 1955
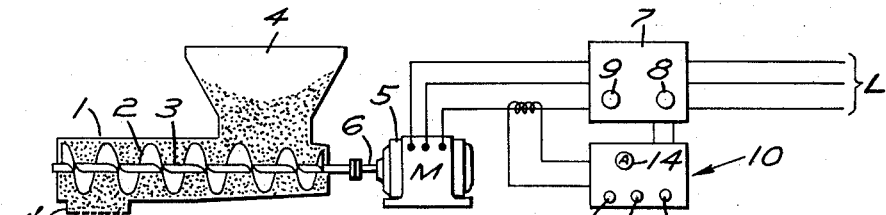
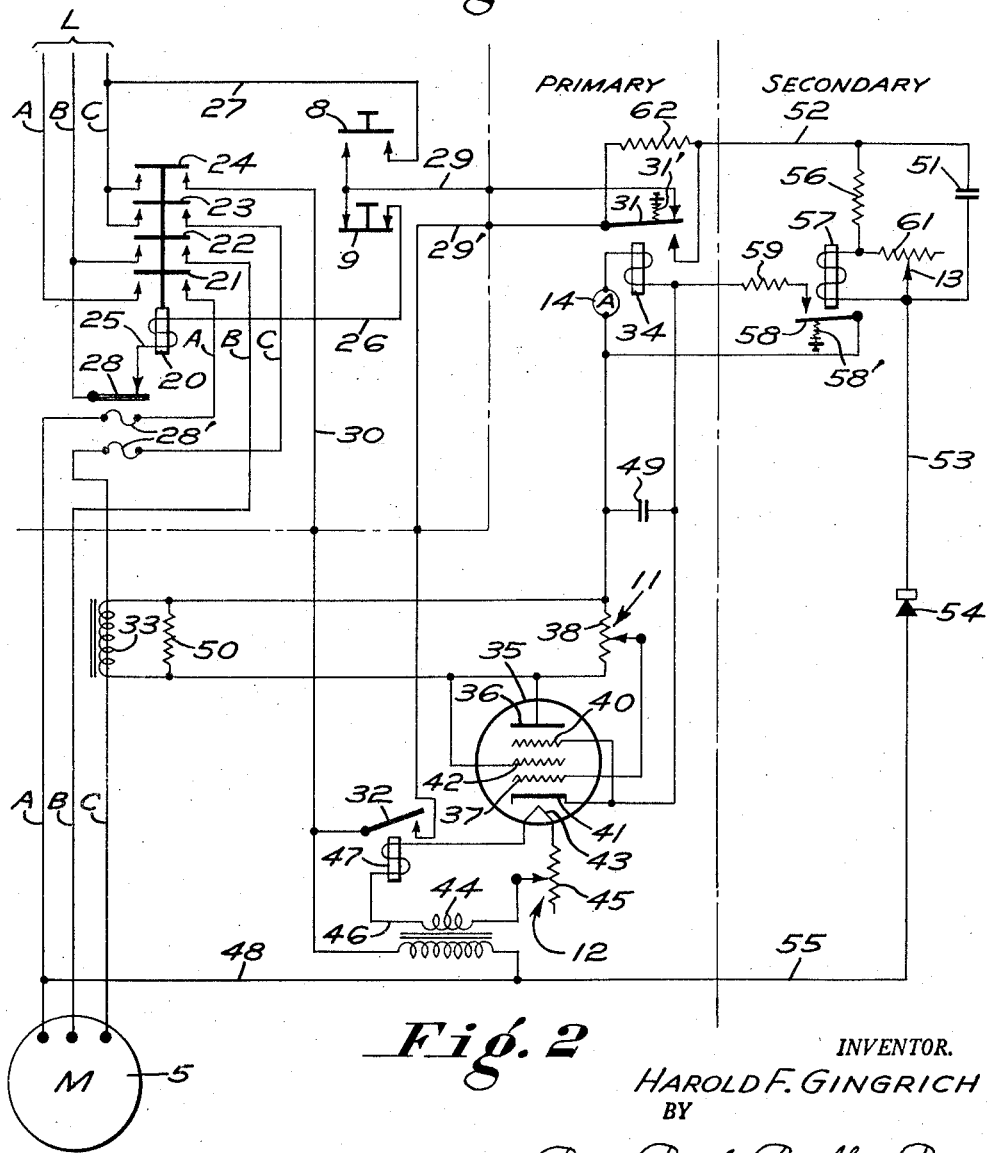
INVENTOR.
HAROLD F. GINGRICH
BY
Beau, Brooks, Buckley & Beau,
ATTORNEYS.

2,846,633

PROTECTION DEVICE FOR MOTOR DRIVEN EQUIPMENT

Harold F. Gingrich, Palmyra, Pa., assignor of one-third to Theodore K. Banks and one-third to Harold Bacome Brewer, both of Hershey, Pa.

Application January 14, 1955, Serial No. 481,766

11 Claims. (Cl. 318—447)

This invention relates generally to the overload protection art, and more specifically to a new and useful electrical control device for protecting driven equipment against damage resulting from overloading thereof.

This invention is concerned with the problem of providing overload protection for machinery being driven by an electric motor. In many instances, the driving motor is capable of delivering more power than that which is required to drive the machine under normal load conditions. This occurs because electric motors are not available in all required ratings, whereby in many instances if a stock motor is to be used it will have a rated capacity above that which is required for the particular machine. Furthermore, in many situations it is virtually impossible to accurately predict the normal running load on the machine, making it necessary to select a driving motor having a capacity in excess of the contemplated requirements. Also, in many instances, such as in the process industry, it is often desired to vary the loading on a particular machine and of course the driving motor must be capable of handling all such desired load variations, whereby even if the driving motor has a rated capacity close to that required for a particular load, upon varying the loading it will be found that the motor capacity exceeds that which is required under such conditions. In addition, in some instances the starting load on the machine exceeds its normal running load, and of course the driving motor must have sufficient capacity to handle the starting load.

When the driven machine becomes overloaded, it is often essential, in order to avoid damaging the machine, that the driving force of the electric motor be discontinued immediately. Consider, for example, a machine such as a screw type conveyor being driven by an electric motor under normal loading requiring considerably less than full motor capacity. If the conveyor should suddenly become dangerously overloaded, as by a foreign object jamming the conveyor and holding the screw against rotation, the conveyor will be severely and possibly irreparably damaged unless the driving force is immediately discontinued.

It is of course common practice to provide overload protection devices for the electric motor, such devices usually comprising, in addition to the large circuit breakers in the main power line, an overload protection and control switch device directly associated with the electric motor. However, such protection devices usually are set for the rated capacity of the motor and therefore are activated only when the motor is overloaded beyond its rated capacity. Indeed, such devices will even permit short periods of operation in excess of the rated capacity of the motor. Obviously such motor protection devices do not provide overload protection for the driven machine which under normal running conditions loads the motor below its rated capacity because if the machine becomes overloaded the motor will continue attempting to drive the same until the load on the motor first builds up to and then exceeds its rated capacity sufficiently to actuate the motor protection device. The machine would be overloaded during all of this time and if the opposed overload and driving forces were of sufficient strength damage to the machine would result. Furthermore, conventional motor protection devices usually are adapted to be opened by heater elements and severe damage to the machine can occur during the time consumed in heating up such elements. Therefore, even if the rated capacity of the driving motor should correspond closely to the normal load on the machine, the usual motor protection devices would not protect the driven machine because they are not sufficiently sensitive and they are relatively slow acting.

Therefore, the usual electric motor protection devices do not protect the machine being driven by the motor because they are set for actuation upon overloading of the motor whereas the machine will be overloaded while the motor is operating at less than its rated capacity, and because they have an inherent time delay.

Heretofore, the customary practice has been to rely on mechanical disconnect devices interposed in the drive coupling between the electric motor and the driven machine, and resort usually has been made to either shear pin arrangements or slip clutch devices. However, such devices are generally unsatisfactory for several reasons.

For example, shear pins are notoriously unpredictable as to the exact point at which they will shear, and therefore they do not provide the degree of accuracy necessary to fully and properly protect the machine.

Also, in many instances the shear pin will twist before it shears, whereby shear pin protection devices do not always act sufficiently rapidly to prevent damage to the machine.

Shear pin arrangements suffer an additional disadvantage in that they are inherently non-adjustable and are therefore inconvenient to use where it is desired to vary the maximum normal loading of the machine. Also, shear pin devices often are relatively inaccessible.

Slip clutch devices are also apt to be unpredictable and therefore unreliable where a sensitive and accurate protection control is desired, and in addition they are apt to cut off gradually and therefore cannot be depended upon to act in sufficient time to protect the machine. Also, slip clutch devices take up a considerable space and are otherwise inconvenient.

Other mechanical arrangements have been proposed but they suffer similar disadvantages. Therefore, there are many instances where conventional mechanical overload release devices simply do not provide the desired degree of protection.

Accordingly, it is a primary object of this invention to provide in combination with a machine driven by an electric motor, an extremely sensitive device for protecting the machine by interrupting the power being applied thereto by the electric motor virtually instantaneously upon the occurrence of an undesired overload on the driven machine.

It is also an object of this invention to provide a machine protecting device as aforesaid which is readily and accurately adjustable to selectively vary the maximum permissible loading of the driven machine between a wide range which can encompass the full operating range of the electric motor driving the same.

Another object of this invention is to provide an electronically operated machine protection device as aforesaid which is adapted to be readily added to existing electric motor protection equipment for use in conjunction therewith.

A further object of this invention is to provide a driven machine protection device having the aforesaid characteristics and incorporating time delay means automatically operable to prevent normal operation of the device for a period of time sufficient to enable starting of the electric motor.

Still another object of this invention is to provide a machine protection device including time delay means enabling starting of the electric motor and cooperating with the motor start button to discriminate between machine overload and motor starting conditions.

A machine protection device in accord with my invention is characterized in one aspect thereof by the provision, in combination with a machine driven by an electric motor having an energizing circuit, of relay means having current responsive input means operatively associated with the motor energizing circuit, output means in controlling relation to said energizing circuit, and means coupling said output means to said input means to actuate the former upon a predetermined energization of the latter, said coupling means being adjustable to selectively vary that energization of the input means which will actuate the output means.

In another aspect thereof, a machine protecting device in accord with my invention is characterized by the provision of relay means having current responsive input circuit means associated with the motor energizing circuit, output circuit means in controlling relation to the motor energizing circuit, and means coupling the output circuit means to the input circuit means to provide for energization of the former continuously with energization of the latter, the coupling means being adjustable to selectively vary the level of energization of the output circuit means for a given energization of the input circuit means.

In still another aspect thereof, a machine protection device in accord with my invention is characterized by the provision of primary control means comprising relay means having current responsive input circuit means operatively associated with the motor energizing circuit, output circuit means in controlling relation to the motor energizing circuit, and means coupling the output circuit means to the input circuit means, said coupling means being adjustable to selectively vary the level of energization of the input circuit means which will cause actuation of the relay means, together with overcontrol means operable in response to actuation of said relay means to disable the same for a predetermined interval of time following actuation thereof to thereby enable starting of the motor, said overcontrol means being related to the motor starting switch so as to discriminate between undesired overloading of the machine and normal motor starting conditions.

The foregoing and other objects and advantages of a machine protection device in accord with my invention will become clearly apparent upon a perusal of the ensuing detailed specification, taken together with the accompanying drawing showing my invention in a preferred embodiment thereof and wherein:

Fig. 1 is a diagrammatic illustration showing my invention as it is used in combination with an electric motor driven machine to protect the same against overloading; and Fig. 2 is a schematic wiring diagram of a protection device in accord with my invention.

Referring first to Fig. 1, there is shown for purposes of illustration a screw conveyor 1 having a screw 2 mounted on the shaft 3. A feed hopper 4 is provided for the delivery of material to the conveyor and a discharge chute 4' is provided for the delivery of material therefrom. The conveyor shaft 3 is coupled to the electric motor 5 by an appropriate mechanical coupling 6 whereby there is provided a direct mechanical drive between motor 5 and conveyor 1. Motor 5 is shown as being a three phase motor energized from the line L through the usual motor control and overload protection device 7 having the start button 8 and the stop button 9.

The protection device of my invention is illustrated diagrammatically at 10 and is provided with readily accessible adjustment controls 11, 12 and 13, and an ammeter 14, for purposes to be described. It will be noted that the usual shear pin, slip clutch and other protection devices are dispensed with, and the device 10 of my invention is used in place thereof.

Referring now to the wiring diagram of Fig. 2, the machine protection device of my invention is divided into a primary control section and a secondary or overcontrol section, and is shown in combination with the usual motor control and protection device 7. Motor control device 7 can comprise any conventional arrangement such as for example a No. CR7006 magnetic motor starting switch manufactured by the General Electric Co. of Schenectady, New York, and is schematically illustrated herein as including a relay having a coil 20 and multiple contacts 21, 22, 23 and 24, the first three of said contacts being adapted to close the three power lines A, B and C, respectively, and contact 24 being adapted to close a relay holding circuit.

Coil 20 is connected across lines B and C through a pickup circuit including a normally closed thermostatic switch 28, conductors 25 and 26, the normally closed stop switch 9, the normally open start switch 8, and conductor 27. Upon closing the start button 8 coil 20 is energized and closes the contacts 21–24 to close the motor energizing circuit and complete the usual magnetic switch relay holding circuit shown to include the switch 28, conductors 25 and 26, the normally closed stop switch 9, and conductors 29, 29' and 30. The protection device of my invention is interposed in this holding circuit and serves to complete the same through the normally closed contacts 31 and 32 which form a part of the protection device of the instant invention as will be more fully described hereinafter.

The motor control device 7 also includes heaters 28' in lines A and C which heaters are adapted, upon dangerous overloading of the motor as detected by a sustained rise in line current, to open the thermostatic switch 28 and thereby break the aforesaid relay coil holding circuit. Of course, since the heaters 28' are set to interrupt the relay coil holding circuit only when motor 5 is overloaded beyond its rated capacity, and then only after they have heated up, they do not protect the machine 1 being driven by the motor 5 from overload conditions as previously discussed. Also, heaters 28' will pass motor starting surges which are similar in many respects to the load placed on the motor when conveyor 1 is overloaded.

In accord with the instant invention, means are provided for interrupting the motor energizing circuit, and thereby discontinuing the driving force on machine 1, virtually immediately upon any rise in the motor energizing circuit line current beyond a selectively variable predetermined value thereof which is hereinafter referred to as the normal load current. This term is used to designate the line current in the motor energizing circuit when the screw conveyor 1, or other driven machine, is running normally, and any rise in line current above this value, reflecting an overload on the conveyor, will cause the protection device of my invention to interrupt the motor energization circuit before damage to the machine can occur. The normal load current would of course be considerably below the starting load current drawn by the electric motor.

In accord with my invention, the foregoing is accomplished by means of a line current responsive relay means connected in controlling relation to the aforesaid holding circuit, or its equivalent, the relay means being readily adjustable to select the desired normal load current.

Thus, in the preferred embodiment illustrated in Fig. 2 there is provided a current responsive input circuit including a current transformer 33 operatively associated with line C in the motor energizing circuit and an output circuit including a relay coil 34 operatively associated with the contact 31 interposed in the magnetic switch holding circuit. Transformer 33 is coupled to the coil 34 through an adjustable gain amplifier circuit including a tube 35 having the coil 34 in its cathode circuit. Thus, the plate 36 of tube 35 is connected to one side of transformer 33 and its cathode 41 is connected through the coil 34 to the other side of the transformer. The control grid 37 is connected to the movable tap of a potentiometer 38 placed across transformer 33. Therefore, tube 35 functions as a grid controlled rectifier, and the term "amplifier" is used in its broadest sense to characterize the coupling circuit as one wherein the over-all ratio of output to input is selectively variable by a control circuit auxiliary to the load circuit, although in the instant embodiment this ratio or "gain" would never exceed unity.

Tube 35 preferably comprises a pentode used as a triode, the suppressor grid 40 being connected to the cathode 41 and the screen grid 42 being connected to the plate 36. Also, tube 35 is shown as being of the heater type with its heater filament 43 being energized by a filament transformer 44 through an adjustable resistor 45, a conductor 46, and a coil 47 operatively associated with the normally closed contact 32. Transformer 44 is connected across lines A and C through conductor 48 and conductor 30 and contact 24 of the aforesaid magnetic switch holding circuit.

The operation of this primary control section, which for many purposes is a protection device complete in itself, is as follows. Assume that motor 5 have been started and is driving the conveyor screw 2 under normal running conditions. The normal load current appearing in the motor energizing circuit is below the motor starting load current and even below the rated running load current of the motor and therefore well below the current which would cause heaters 28' to open the switch 28 of the usual motor protection device. This normal load current passing through line C energizes transformer 33 causing a voltage to appear across tube 35 and load coil 34 with the current passing from transformer 33 through coil 34 being amplified and rectified by the tube 35. The potentiometer 38 is adjusted through the control 11 so that the current passing through coil 34 is almost but not quite sufficient for coil 34 to pull in and thereby open contact 31, the amount of current or degree of energization required to actuate coil 34 being referred to hereinafter as the threshold value thereof. In other words, by adjustment of potentiometer 38 coil 34 is energized just to its threshold value when the predetermined normal load current is passing through the line C. Consequently, immediately upon any rise in the line current above the predetermined normal load value thereof, as would occur upon overloading the conveyor, coil 34 is virtually instantaneously energized above its threshold value and moves contact 31 to open the aforesaid magnetic switch holding circuit and thereby deenergize motor 5.

Thus, it is a particular characteristic of the primary control section of my invention that the same is extremely sensitive and fast acting because the output circuit is energized continuously with energization of the input circuit and just at the threshold value thereof whereby only a very slight rise in load current is required to virtually immediately cause the circuit interrupting contact 31 to open and thereby deenergize the motor. The provision of grid adjustment in the coupling circuit by means of the potentiometer 38 permits a substantially infinite number of fine adjustments of the ratio of energization between the output circuit and the input circuit throughout a wide range which can encompass the entire operating range of motor 5, whereby the primary control can be adjusted for any desired normal load current.

Also the adjustment and setting of the primary control by potentiometer 38 is facilitated by the provision of a milliammeter 14 which indicates the current passing through coil 34. The threshold value of coil 34 remains constant, and therefore once it has been determined the primary control is readily adjusted for any desired normal load current by adjusting potentiometer 38 until ammeter 14 indicates that coil 34 is being energized just at its threshold value.

The pentode used as a triode is desired because it provides a larger range of adjustment in the primary control than would be the case if a triode were used. Also, it should be noted that the absence of an independent plate and/or grid supply provides a more stable tube operation.

Contact 32, previously described as being in the magnetic switch holding circuit, is held in closed position by coil 47 and is adapted to open the aforesaid holding circuit and thereby deenergize motor 5 if for any reason the filament current is interrupted, thereby making my protection device fail safe.

A filter condenser 49 is provided across coil 34, but is selected to have a low capacity in order to avoid sluggishness in the operation of my primary control. Also, a load resistor 50 is placed across transformer 33 to prevent undesirably high voltages on surges.

The relay 31, 34 comprises a plate relay having a coil 34 of relatively high resistance, as for example on the order of 10,000 ohms, so as to draw a low current from the input transformer 33 to thereby provide a highly sensitive control.

When the motor 5 is first started the starting load current surge in line C will of course exceed the normal load current for which the primary control is set. In order to prevent actuation of the primary control in the above described manner in response to the starting load current, and thereby enable the motor to be started so that it and the driven machine can reach their normal running condition, the filament heater of tube 35 is connected to be energized upon starting of the motor and is preferably under the control of the motor control switch coil 20 through its contact 24, whereby energization of the heater occurs simultaneously with energization of the motor. The time required for heater filament 43 to warm up provides the time delay in normal functioning of the primary control necessary to permit starting of the motor and because the heater energizing circuit is closed by closing of the motor energizing circuit, the heater time delay is properly timed with relation to the motor starting surge.

Thus, when the filament heater is first energized the cathode emission level is so low that the current required to pass through line C in order to energize coil 34 above its threshold value exceeds not only the normal load current for which the primary control has been set but also the starting load current. As the cathode emission increases during this filament heater warm up period the starting load current surge decreases so that by the time tube 35 is in normal operating condition the starting surge is dissipated and the motor and driven machine are in normal running condition with only the predetermined normal load current passing through line C.

In order to accommodate variations in the time required for the motor and the driven machine to reach normal running condition, while at the same time ensuring that the starting time delay not exceed that which is required, adjustable resistor 45, with its control 12, is provided to selectively vary the time required for filament 43 to heat up.

Thus, the primary control section of my invention is adapted to function as a complete unit and to at all times fully protect the driven machine. However, in some instances it is desired to repeatedly start and stop the motor 5 and the machine being driven thereby, as in the case of a conveyor moving with a step by step motion. The aforesaid filament heater time delay arrangement enables the initial starting of the motor, but once the heater 43 of tube 35 has warmed up it will not permit rapid starting and stopping of the motor because it will not have sufficient time to cool down and again serve as a time delay. Therefore, in order to adapt my primary control to installations where repeated starting and stopping is required I provide in accord with my invention a secondary or overcontrol section which operates extremely rapidly upon actuation of the primary control, and prior to release of the start button 8, to disable the primary control for an interval of time sufficient to accomplish the motor starting operation. Thus, in accord with my invention there is provided an overcontrol which functions to disable the primary control and thereby permit starting of the motor regardless of the condition of the primary control heater, this overcontrol being related to the motor start button so as to discriminate between a desired starting load condition and an undesired overload condition and thereby ensure disabling of the primary only upon starting of the motor.

The overcontrol circuit of my invention is actuated only when the primary control is actuated to break the aforesaid holding circuit, and therefore it is a particular feature of this invention that my primary control circuit functions very rapidly so as to enable my overcontrol circuit to disable the primary control before the operator would normally release the motor start button 8 even though the start button is normally held depressed or closed for only a second or two.

In accord with my invention, I provide an overcontrol circuit which reduces the current flowing through the relay coil 34, and therefore the energization level thereof, sufficiently to permit starting surges to pass through line C without causing energization of coil 34 above its threshold value.

Thus, contact 31 is a break and then make contact so that after it opens the aforesaid holding circuit it closes a condenser charging circuit for the condenser 51 through contact 24, conductor 30, contact 32, conductor 29', contact 31, conductors 52 and 53, rectifier 54 and conductor 55 which is connected to line A. Once charged, condenser 51 decays through a network including the resistor 56, a coil 57 and a variable resistor 61, causing coil 57 to close a contact 58 operatively associated therewith and thereby place the load resistor 59 across coil 34. Coil 57, like coil 34, is selected to have a relatively high resistance. Load resistor 59 is selected to reduce the current passing through coil 34 by for example from 60 to 70 percent while maintaining the coil 34 partially magnetized in order to prevent false pick up upon return to normal operating condition. With this reduction in the current passing through coil 34, the energization thereof drops below the threshold value even during starting surges and contact 31 closes to again complete the holding circuit and thereby permit energization of the motor. The decay action of condenser 51 is of sufficient duration to permit the starting operation, and is selected to have a very high capacitance on the order of 100–200 mfd.

It will be noted that the primary control breaks the holding circuit before it actuates the overcontrol. Therefore, in the event of an overload condition the overcontrol has no effect and the primary control protects the driven machine in the manner previously described. However, under motor starting conditions the start button 8 is normally held depressed for a time which, though extremely short, is sufficient to bridge the interval during which contact 31 is in open position with respect to the motor control switch holding circuit, i. e. the interval between actuation of the primary control and commencement of the disabling action by the overcontrol.

Thus, my overcontrol circuit is related to my primary control and to the usual motor start button so as to discriminate between machine overload and motor starting conditions, and this discriminating action is made possible by the extremely rapid action of my primary and overcontrol circuits.

In order to permit adjustment of the time interval during which the primary control is disabled by the overcontrol I provide an adjustable resistor 61 with its control 13 to vary the condenser decay rate and therefore the length of time during which contact 58 will be held closed. Also, a resistor 62 is provided across contact 31 in the overcontrol circuit to suppress arcing.

The potentiometer 38, with its control 11, and the adjustable resistor 61, with its control 13, provide for fine adjustment of the primary control and the overcontrol, respectively. In addition, relatively coarse adjustment thereof is provided by the adjustable springs 31' and 58' on contacts 31 and 58, respectively.

Therefore, my invention fully accomplishes the aforesaid objects and provides an extremely sensitive and fast acting device for protecting machines driven by an electric motor against overload by discontinuing the driving power virtually immediately upon a rise in load current above a selectively variable predetermined normal load current. While only a presently preferred embodiment of my invention is disclosed in detail herein, it will be appreciated that the same is susceptible of various modifications without departing from the spirit of my invention as expressed in the appended claims.

Having fully disclosed my invention, and described the mode of operation thereof, what I claim as new is:

1. In combination with a machine driven by an electric motor having an energizing circuit, driving force limiting means for protecting the machine against overload comprising relay means having current responsive input means operatively associated with said motor energizing circuit for energization at a level determined by the current passing through said energizing circuit and output means connected in controlling relation to said energizing circuit to open the same upon the occurrence of an overload on said machine as determined by a current rise in said energizing circuit, said relay means including adjustable gain amplifier means coupling said output means to said input means for continuous energization thereby, said amplifier means being adjustable to selectively vary the level of energization of said output means for a given energization of said input means.

2. In combination with a machine driven by an electric motor having an energizing circuit, driving force limiting means for protecting the machine against overload comprising relay means having current responsive circuit means operatively associated with said motor energizing circuit for energization at a level determined by the current passing through said energizing circuit, output circuit means connected in controlling relation to said energizing circuit to open the same, and means coupling said output circuit means to said input circuit means for continuous energization of said output circuit means by said input circuit means through said coupling means, and coupling means being adjustable to selectively vary the energization ratio between said output circuit means and said input circuit means and thereby enable energization of said output circuit means by said input circuit means at a level just below that required to open said motor energizing circuit when a predetermined load current is passing through said motor energizing circuit, whereby said relay means will open said motor energizing circuit substantially immediately upon a current rise in said motor energizing circuit above said predetermined load current.

3. In combination with a machine driven by an electric motor having an energizing circuit, driving force limiting means for protecting the machine against overload comprising relay means having current responsive input circuit means operatively associated with said motor energizing circuit for energization at a level determined by the current passing through said energizing circuit, said relay means including direct current operable electromagnetic contactor means operatively coupled to said energizing circuit to open the same, and means including vacuum tube rectifier means coupling said contactor means to said input circuit means for continuous energization thereby through said coupling means, said rectifier means having a manually adjustable control grid coupled to said input circuit means for selectively varying the level of such continuous energization of said contactor means for any given energization of said input circuit means.

4. In combination with a machine driven by an electric motor, torque limiting means protecting the machine against overload comprising, relay means including current responsive input means operatively associated with the motor energizing circuit for energization at a level determined by the current passing through said energizing circuit, output means operable to open said motor energizing circuit, means including a cathode heater tube coupling said relay input and output means for continuous energization of the latter by the former through said coupling means, and heater filament supply means connected to be energized in substantial synchronism with energization of the motor, whereby energization of the heater filament proceeds with energization of the motor to delay the normal motor energizing circuit opening response of said relay means and thereby permit starting of the motor.

5. In combination with a machine driven by an electric motor having an energizing circuit including a control switch adapted to be closed by a normally open start button and a holding circuit adapted to hold said control switch closed, drive force limiting means for protecting the machine against overload comprising, relay means having current responsive input circuit means operatively associated with said motor energizing circuit, output circuit means connected in controlling relation to said holding circuit, and means coupling said output circuit means to said input circuit means for actuaton of said relay means to open said holding circuit when the current in said energizing circut exceeds a predetermined value, and relay overcontrol means operable automatically in response to such actuation of said relay means to thereafter prevent the normal energizing circuit current response thereof and permit reclosing of said holding circuit for a predetermined interval of time sufficient to enable starting of the motor, the interval between actuation of said relay means and such operation of said overcontrol means in response thereto being bridged by holding said start button closed.

6. The combination set forth in claim 5, wherein said overcontrol means includes adjustable time delay means for selectively varying said predetermined interval of time.

7. In combination with a machine driven by an electric motor having energizing circuit closing means adapted to be energized by a normally open start switch and a holding circuit for said closing means, first control means including current responsive input means associated with the energizing circuit of said motor and output means connected in controlling relation to said holding circuit to open the same when the motor energizing current exceeds a predetermined value, said first control means being adjustable to provide for operation thereof at less than full motor capacity, and second control means operable automatically upon opening of said holding circuit by said first control means to disable the latter, the disabling action of said second control means beginning a first time interval following opening of said holding circuit by said first control means and continuing for a predetermined second time interval, thereby providing for opening and subsequent reclosing of said holding circuit during motor starting current surges, the time interval between such opening and reclosing being bridged by manual retention of said normally open start switch in closed position for discriminating between motor starting surges and machine overload conditions.

8. In combination with a machine driven by an electric motor having an energizing circuit, means including first contactor means adapted to close said energizing circuit, holding circuit means for said first contactor means, and start switch means normally biased to open position and adapted upon closing thereof to close said first contactor means and thereby initiate a motor starting operation, primary control means for protecting said machine against overload conditions and thereby being adapted to deenergize said motor when the same is operating at less than full capacity, said primary control means comprising relay means having current responsive input circuit means operatively associated with said energizing circuit and output circuit means including break before make second contactor means arranged in controlling relation to said holding circuit, said second contactor means having a normal first position closing said holding circuit, and overcontrol means including time delay means operable to prevent the normal response of said primary control means to thereby enable starting of said motor, said second contactor means when energized having a second position closing a triggering circuit means for said overcontrol time delay means, the interval between opening of said second contactor means and disabling of said primary control means by said overcontrol means being bridged by retention of said start switch means in closed position.

9. In combination with a machine driven by an electric motor having an energizing circuit, contactor means adapted to close said energizing circuit, holding circuit means adapted to hold said contactor means closed, and normally open start switch means adapted upon closing thereof to close said contactor means and thereby initiate a motor starting operation, primary control means for protecting said machine against overload comprising relay means having current responsive input means operatively associated with said energizing circuit, output means connected in controlling relation to said holding circuit, and means coupling said output means to said input means for continuous energization in accordance therewith, said coupling means being adjustable to selectively vary the energization ratio between said output means and said input means, and overcontrol means including time delay means operable in response to actuation of said primary control means to prevent the normal energizing circuit current response of said primary control means for a predetermined time to thereby enable starting of said motor, the interval between actuation of said primary control means and operation of said overcontrol means being bridged by momentarily holding said start switch means in closed position.

10. In combination with a machine driven by an electric motor having energizing circuit means including a control switch and holding circuit means therefor, machine protecting torque limiting means comprising motor current responsive relay means having output circuit means connected in controlling relation to said holding circuit means, said relay means comprising relay operating means including adjustable gain amplifier means and time delay means synchronized with energization of said motor by operation of said switch to disable said relay means for a predetermined time following such energization of such motor to enable starting thereof, said amplifier means including cathode heater vacuum tube means and said time delay means including heater filament circuit means arranged for energization concurrently with energization of said motor under the control of said starting switch.

11. An overload protection device for a machine driven by an electric motor and subject to being overloaded when its driving motor is operating at less than rated capacity comprising, relay means having current responsive input means adapted for connection in operative association with the motor energizing circuit for being energized at a level determined by the current passing through the motor energizing circuit, output means adapted for connection in controlling relation to the motor energizing circuit, said output means being adapted for actuation to open the motor energizing circuit upon energization of said output means above a predetermined threshold value, and means coupling said output means to said input means for continuous energization of the former by the latter through said coupling means, said coupling means being adjustable to selectively vary the energization ratio between said output means and said input means to thereby enable continuous energization of said output means just at said predetermined threshold value thereof for any given energization of said input means through a range of energization thereof.

References Cited in the file of this patent

UNITED STATES PATENTS

| | | |
|---|---|---|
| 2,175,889 | Forbes | Oct. 10, 1939 |
| 2,428,723 | Reeves | Oct. 7, 1947 |
| 2,431,316 | Dudley et al. | Nov. 25, 1947 |
| 2,539,123 | Dudley | Jan. 23, 1951 |
| 2,560,640 | Good | July 17, 1951 |

UNITED STATES PATENT OFFICE
CERTIFICATE OF CORRECTION

Patent No. 2,846,633                                                    August 5, 1958

Harold F. Gingrich

It is hereby certified that error appears in the printed specification of the above numbered patent requiring correction and that the said Letters Patent should read as corrected below.

Column 5, line 32, for "have" read -- has --; column 6, line 56, strike out "the", second occurrence; column 8, line 49, for "responsive circuit" read -- responsive input circuit --; line 57, for "and" read -- said --; column 9, line 37, for "actuaton" read -- actuation --.

Signed and sealed this 2nd day of December 1958.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,846,633                                                    August 5, 1958

Harold F. Gingrich

It is hereby certified that error appears in the above numbered patent requiring correction and that the said Letters Patent should read as corrected below.

In the grant, lines 2 and 12, and in the heading to the printed specification, line 5, for "Theodore K. Banks", each occurrence, read -- Theodore R. Banks --.

Signed and sealed this 9th day of June 1959.

(SEAL)
Attest:

KARL H. AXLINE
Attesting Officer

ROBERT C. WATSON
Commissioner of Patents